United States Patent Office 3,234,157
Patented Feb. 8, 1966

3,234,157
OIL MODIFIED NORBORNENE-STYRENE
COPOLYMER COMPOSITIONS
Rupert J. Schefbauer, Hasbrouck Heights, N.J., assignor to Interchemical Corporation, New York, N.Y., a corporation of Ohio
No Drawing. Filed Sept. 14, 1960, Ser. No. 55,856
8 Claims. (Cl. 260—23)

This invention relates to novel hydroxy-containing copolymers of aryl-ethylenes with 2-hydroxymethyl-5-norbornene and to drying oils and alkyd resins prepared therefrom.

2-hydroxymethyl-5-norbornene has the formula:

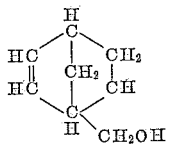

and may be conveniently prepared from cyclopentadiene and allyl alcohol by the process disclosed in U.S. Patent No. 2,352,606.

In preparing my novel copolymers of 2-hydroxymethyl-5-norbornene and an aryl ethylene, for instance styrene, I mix the two monomers in a ratio of between 1:1 and 1:10 in the presence of a suitable catalyst of the free-radical type, and heat the solution to a temperature of from about 150° C. to about 180° C. for a period of time of from about one to about 15 hours. The conversion to copolymer is more rapid when the reaction is first started and then levels off and is usually substantially nil after about 15 hours reaction time.

As stated above, catalysts of the free-radical type are suitable for initiating the copolymerization of 2-hydroxymethyl-5-norbornene with aryl ethylenes. Catalysts, or, as they are more correctly designated, reaction initiators of this type are well known. Among those suitable are benzoyl peroxide, tertiary butyl peroxide, tertiary butyl perbenzoate, methyl ethyl ketone hydro-peroxide, cyclohexane hydroperoxide, lauroyl peroxide, perbenzoic acid, peractic acid, butyl hydroperoxide, hydrogen peroxide, azobisisobutyronitrile, and similar compounds. The preferred catalyst is di-teritary butyl peroxide because it is most effective at the preferred temperature range.

These addition copolymers of 2-hydroxymethyl-5-norbornene with aryl ethylenes are hydroxy-containing compounds, and an important aspect of my invention is the production of drying oils and alkyd resins and oil-modified alkyds employing these novel copolymers to replace part of the simple polyols ordinarily employed in the production of such drying oils, alkyds and oil modified alkyds. These alkyds and oil modified alkyds possess excellent pigment-dispersing properties and are especially valuable in the preparation of varnishes and baking enamels, to which finishes they impart excellent gloss, hardness, and resistance to stains and solvents.

The following examples will serve to illustrate my invention, but it is to be understood that they do not in any way limit the scope of the invention, which is defined solely by the appended claims.

Example I

A mixture of 2.04 grams of di-tertiary-butyl peroxide and 104 grams of styrene is added slowly to 134 grams of 92.8% pure 2-hydroxymethyl-5-norbornene over a period of 45 minutes while maintaining the temperature of the reaction mixture at 160–165° C. After another 30 minutes, the temperature is raised to about 180° C. and there maintained for about 4½ hours. The reaction mixture is then allowed to cool somewhat and is vacuum-stripped at 1 mm. pressure while heating gradually to 200° C. The resinous non-volatile residue remaining amounts to 112 grams. This resin is soluble in xylene, and can be precipitated therefrom by addition of methanol. A sample so prepared is found by hydroxyl determination to contain 1.3% hydroxyl. From this it may be calculated that the hydroxyl equivalent weight of the resin is about 1300, and that the copolymer must therefore contain at least 9.5 wt. percent 2-hydroxymethyl-5-norbornene. Determination of average molecular weight by the Rast (camphor) method gives a value of 1942. The product melts over the 92–96° C. range.

Example II

A mixture of 4.8 grams of di-tertiary-butyl perxiode and 208 grams of styrene is added slowly over a period of four hours to 134 grams of 92.8% pure 2-hydroxymethyl-5-norbornene maintained at 175–180° C. The reaction mixture is maintained at this temperature for an additional 10 hours after the addition is complete. The reaction mixture is then vacuum-stripped at 1 mm. Hg pressure to a final temperature of 198° C. The weight of the residue is about 250 grams. Since the distillate is substantially free of styrene, it is apparent that the copolymer contains about 17% 2-hydroxymethyl-5-norbornene. Hydroxyl determination indicates 1.3% hydroxyl by weight, or a hydroxyl equivalent weight of about 1300. The product exhibits a melting point at 85–87° C., and average molecular weight determination by the Rast (camphor) method gives a value of 717.

Example III

A solution of 14.3 grams of di-tertiary-butyl peroxide in 728 grams of styrene is added slowly, with stirring and over a period of about 2½ hours, to 938 grams of 92.8% pure 2-hydroxymethyl-5-norbornene at a temperature of 165–170° C. After the addition is completed, the temperature is allowed to rise to 180–185 and kept there for about six hours.

Example IV

Two hundred sixty-two parts of the product of Example II are mixed with 280 parts of soya oil fatty acids and heated over a 14-hour period to a final temperature of 238° C. After the first six hours, the temperature reaches 230° C. and the acid number falls to 9.8.

A portion of the product of this example is flowed onto a panel of cold rolled steel and baked for ½ hour at 350° F. The resultant film is hard and scratch-resistant and shows outstanding resistance to water, 5% sodium hydroxide, and dilute sulfuric acid at room temperature.

Example V

This is similar to Example IV except that 280 parts of dehydrated castor oil fatty acids are used in place of the soya acids of Example VI. Final acid number is 107. Films baked ½ hour at 350° F. (on cold rolled steel) are glossy and somewhat harder than those of Example VI and show excellent resistance to room temperature attack by water, dilute sulfuric acid, and 5% sodium hydroxide.

Example VI

This is similar to example IV except that 280 parts of linseed oil fatty acids are used in place of the soya acids of that example. Final acid number is 8.1. Baked films from this material are very glossy, are harder than those of Examples VI and VII, and exhibit good resistance at room temperature to water, dilute sulfuric acid, and dilute caustic soda.

Example VII

A mixture of 490 parts of soya fatty acids and 184 parts of 95% glycerine is heated to a temperature of about 220° C. for 3 hours. At the end of this heating, the acid number is 4. At this point, 258 parts of maleic anhydride are added at a temperature of 130° C. The mixture is kept at this temperature for ½ hour and then allowed to cool over night. A mixture of 524 parts of the product of Example III and 160 parts of xylene are now added and the whole mixture is heated for 4 hours under a Dean-Stark trap and a reflux condenser. Refluxing commences at 180° C., and the temperature gradually rises to 200° C. At the end of this four-hour period the acid number is 14.2. 726 parts of xylene are now added to give an alkyd solution containing 60% solids.

Example VIII

Fifty parts of the product of Example IV and fifty parts of Epon 1004 are heated together in an open vessel for 5 hours to a final temperature of 253° C. The mixture is at first non-homogenous, but after an hour of heating, the mixture becomes homogenous at 250°, though it separates if cooled. After four hours more of heating, however, the mixture remains homogenous even on cooling.

A portion of this product was spread out in a film on glass and baked ½ hour at 350° F. The resulting cured film exhibited excellent resistance to aqueous 4% sodium hydroxide, showing no change after 100 hours exposure at room temperature.

"Epon 1004" is the trademark for a diglycidyl ether of bisphenol A resin, having a melting point of 95–105° C., an epoxide equivalent of 870–1,025, and an average molecular weight of 1,400. Bisphenol A is di(4-hydroxyphenyl)-dimethylmethane.

What is claimed is:

1. A resinous composition comprising the free-radical initiated addition copolymer of 2-hydroxymethyl-5-norbornene and styrene, the copolymerization process having been carried out at a temperature of from about 150° to about 180° C. with a mixture of 1 part by weight of 2-hydroxymethyl-5-norbornene monomer and 1 to 10 parts by weight of styrene monomer.

2. A film forming composition comprising the reaction product of a composition according to claim 1, with a drying oil fatty acid.

3. A film forming composition comprising the reaction product of a composition according to claim 1 with soya fatty acids.

4. A film forming composition comprising the reaction product of a composition according to claim 1 with dehydrated castor oil fatty acids.

5. A film forming composition comprising the reaction product of a composition according to claim 1 with linseed oil fatty acids.

6. An alkyd resin comprising the co-esterification product of drying oil fatty acids, glycerine, maleic anhydride, and a composition according to claim 1.

7. A resinous film forming composition comprising the reaction product of (A) a diglycidyl ether of di(4-hydroxyphenyl)-dimethyl methane resin having an epoxide equivalent of the order of 870–1,025 and a molecular weight of the order of 1,400; (B) the product obtained by reaction of soya fatty acids with a composition according to claim 1.

8. The resinous composition described in claim 1, with the further limitation that the copolymerization process is carried out for a period of time varying from about one hour to about 15 hours.

References Cited by the Examiner
UNITED STATES PATENTS

| | | | |
|---|---|---|---|
| 2,352,606 | 7/1944 | Alder et al. | 260—617 |
| 2,630,430 | 3/1953 | Shokal et al. | 260—23 |
| 2,894,938 | 7/1959 | Chapin et al. | 260—23 |
| 2,899,404 | 8/1959 | Chapin et al. | 260—23 |
| 2,985,611 | 5/1961 | Gaylord et al. | 260—30.8 |

OTHER REFERENCES

Lee et al.: "Epoxy Resins," McGraw-Hill, New York 1957, pages 15–20.

LEON J. BERCOVITZ, *Primary Examiner.*

ALPHONSO SULLIVAN, MILTON STERMAN,
*Examiners.*